United States Patent
Koshigaya

(10) Patent No.: US 10,237,426 B2
(45) Date of Patent: Mar. 19, 2019

(54) INFORMATION PROCESSING APPARATUS THAT EXECUTES A DESIRED WIRELESS COMMUNICATION, CONTROL METHOD OF INFORMATION PROCESSING APPARATUS, AND STORAGE MEDIUM

(71) Applicant: CANON KABUSHIKI KAISHA, Tokyo (JP)

(72) Inventor: Motoki Koshigaya, Matsudo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/622,485

(22) Filed: Jun. 14, 2017

(65) Prior Publication Data

US 2018/0013903 A1 Jan. 11, 2018

(30) Foreign Application Priority Data

Jul. 5, 2016 (JP) .................................. 2016-133223

(51) Int. Cl.
*G06F 3/12* (2006.01)
*H04N 1/00* (2006.01)
(Continued)

(52) U.S. Cl.
CPC ....... *H04N 1/00342* (2013.01); *H04B 5/0056* (2013.01); *H04N 1/00307* (2013.01);
(Continued)

(58) Field of Classification Search
CPC ........... H04N 1/00307; H04N 1/00342; H04N 1/00413; H04N 1/00474; H04N 2201/0039; H04N 2201/0055; H04N 2201/006; H04N 2201/0094; H04N 2201/0041; H04W 4/80; H04W 4/008; H04W 88/06; H04B 5/0056;
(Continued)

(56) References Cited

U.S. PATENT DOCUMENTS

2012/0045994 A1* 2/2012 Koh ..................... H04L 63/0492
455/41.3
2013/0215467 A1* 8/2013 Fein ....................... G06F 3/1204
358/1.15

(Continued)

FOREIGN PATENT DOCUMENTS

JP 2009277106 A 11/2009

*Primary Examiner* — Gabriel I Garcia
(74) *Attorney, Agent, or Firm* — Rossi, Kimms & McDowell LLP

(57) ABSTRACT

A communication device communicates with an external apparatus including first and second Near Field Communication (NFC) circuits. The communication device includes a display configured to display information, a third NFC circuit, and a controller configured to cause display of first and second screens that prompt a user to carry out an operation for starting NFC communication. The first screen is displayed in a state in which the third NFC circuit is not permitted to perform specified communication with the first NFC circuit but is permitted to perform specified communication with the second NFC circuit, and the second screen is displayed in a state in which the third NFC circuit is permitted to perform specified communication with the first NFC circuit but is not permitted to perform specified communication with the second NFC circuit.

18 Claims, 16 Drawing Sheets

(51) Int. Cl.
   *H04B 5/00*      (2006.01)
   *H04W 4/80*      (2018.01)
   *H04W 88/06*     (2009.01)

(52) U.S. Cl.
   CPC ..... *H04N 1/00413* (2013.01); *H04N 1/00474* (2013.01); *H04W 4/80* (2018.02); *H04N 2201/006* (2013.01); *H04N 2201/0039* (2013.01); *H04N 2201/0041* (2013.01); *H04N 2201/0055* (2013.01); *H04N 2201/0094* (2013.01); *H04W 88/06* (2013.01)

(58) Field of Classification Search
   CPC .... G06F 3/1204; G06F 3/1229; G06F 3/1236; G06F 3/1259; G06F 3/1292; G06F 3/1206
   USPC .................................................. 358/1.1–1.18
   See application file for complete search history.

(56) References Cited

U.S. PATENT DOCUMENTS

| | | | | |
|---|---|---|---|---|
| 2014/0297892 A1* | 10/2014 | Kaigawa | ............... | G06F 3/1204 710/5 |
| 2014/0340698 A1* | 11/2014 | Baba | ................... | H04B 5/0056 358/1.13 |
| 2014/0340701 A1* | 11/2014 | Okamura | ................ | G06F 3/121 358/1.14 |
| 2016/0255238 A1* | 9/2016 | Saito | .................. | H04N 1/32747 358/1.13 |

* cited by examiner

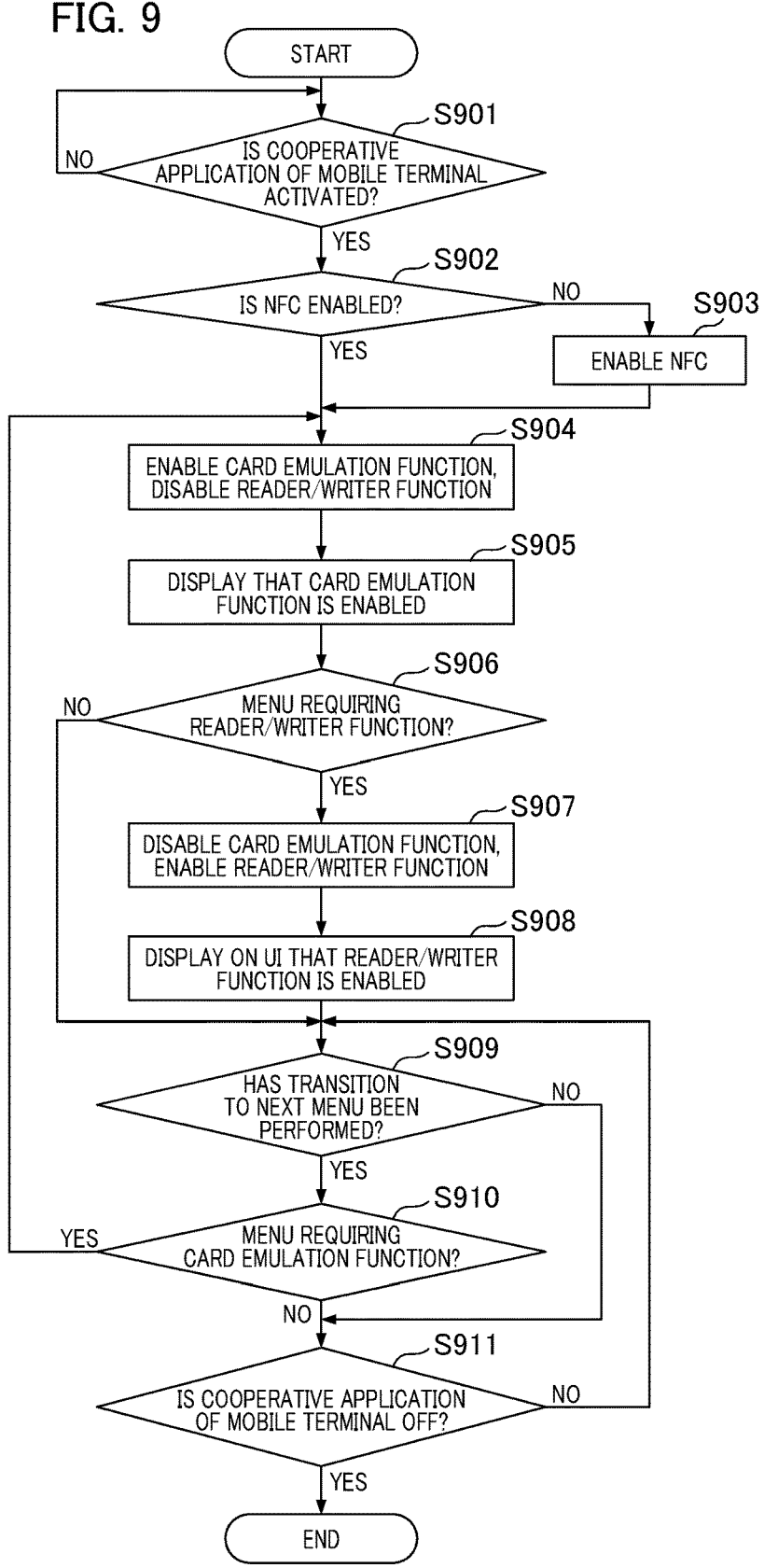

INFORMATION PROCESSING APPARATUS THAT EXECUTES A DESIRED WIRELESS COMMUNICATION, CONTROL METHOD OF INFORMATION PROCESSING APPARATUS, AND STORAGE MEDIUM

BACKGROUND OF THE INVENTION

Field of the Invention

The present invention relates to an information processing apparatus having a near field wireless communication function, a control method for the information processing apparatus, and a storage medium.

Description of the Related Art

In recent years, a mobile terminal having a near field wireless communication (non-contact wireless communication) function, for example, a function that executes wireless communication based on NFC (near field communication) has been suggested. A user can execute transmitting and receiving data between an external apparatus and the mobile terminal by an intuitive operation that has the mobile terminal approach the external apparatus having the near field wireless communication function (an action to be in contact with, hereinafter referred to as "touch").

By using the near field wireless communication function, for example, it is possible to consider having the mobile terminal read and obtain information embedded in a poster, a tagged seal, and the like, and having the external apparatus read ID information held by the mobile terminal thereby to perform a login. Accordingly, it is possible to find a new value by utilizing the near field wireless communication function and electronic devices cooperating with each other.

If wireless communication based on NFC is executed, it is possible to use three functions (operation modes) defined by the specification of NFC. The first is a reader/writer function, by which reading and writing of data to and from an NFC card and a NFC tag can be performed. The second is a card emulation function, by which an operation that is equivalent to the NFC tag (passive tag) that can be read by the reader/writer function can be performed. The third is a peer-to-peer (P2P) function, by which the transmission and reception of various data via NFC is possible.

Japanese Patent Application Laid-Open Publication No. 2009-277106 discloses that, in a mobile terminal, the non-contact IC function is selectively used for work and private use. Japanese Patent Application Laid-Open Publication No. 2009-277106 discloses managing the non-contact IC card by dividing it into at least two non-contact IC card functions, and activating a desired one of the non-contact IC card functions and deactivating the other one of the non-contact IC card functions.

However, the technique disclosed in Japanese Patent Application Laid-Open Publication No. 2009-277106 is an application of the card emulation function of NFC, and switches the regions to be activated with respect to the NFC reader. That is, selectively using the three functions defined by the specification of NFC is not assumed. In this manner, as various functions become widespread, it is desired to execute a wireless communication in a desired operation mode depending on the use without the user being aware.

SUMMARY OF THE INVENTION

The present invention is to provide an information processing apparatus that can suppress a mistaken operation and execute a wireless communication in a desired operation mode in an information processing apparatus having a near field wireless communication function.

An information processing apparatus according to one embodiment of the present invention is an information processing that has a near field wireless communication function, wherein the information processing apparatus has a first mode by which information held by the information processing apparatus is read by an external apparatus by using the near field wireless communication function, and a second mode by which information held by the external apparatus is read by using the near field wireless communication function. The information processing apparatus comprises a control unit configured to control the first mode and the second mode based on display contents of a screen displayed by the information processing apparatus.

Further features of the present invention will become apparent from the following description of exemplary embodiments (with reference to the attached drawings).

BRIEF DESCRIPTION OF THE DRAWINGS

FIG. 9 is a flowchart illustrating the operation of a cooperative application 801 of the mobile terminal.

DESCRIPTION OF THE EMBODIMENTS

Hereinafter, preferred embodiments of the present invention will be described with reference to attached drawings and the like.

First Embodiment

Figure 1:
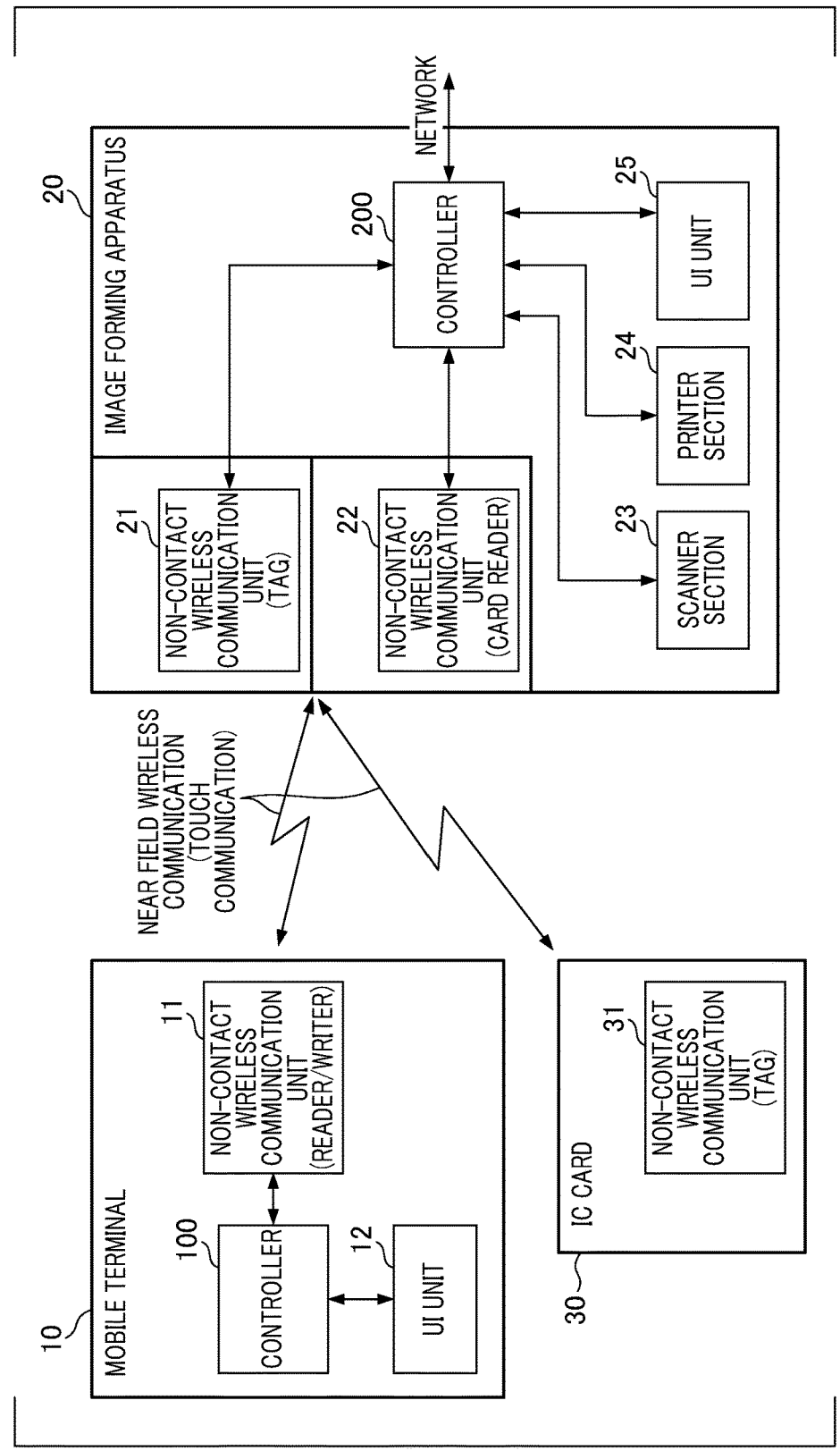
FIG. 1 illustrates the entire configuration of an information processing system according to the present embodiment.

FIG. 1 illustrates the entire configuration of an information processing system in the first embodiment of the present invention. The information processing system in the present embodiment is provided with a mobile terminal 10 having a non-contact wireless communication unit (reader/writer) 11 that executes near field wireless communication and an image forming apparatus 20 serving as an external apparatus that executes near field wireless communication with the mobile terminal 10. The image forming apparatus 20 has a non-contact wireless communication unit (tag) 21 and a non-contact wireless communication unit (card reader) 22 that execute a near field wireless communication. Additionally, the information processing system is provided with an IC card 30 having a non-contact wireless communication unit (tag) 31.

Note that, in present embodiment, although the image forming apparatus 20 is explained as one example of the external apparatuses, the present invention is not limited thereto, and, for example, the present invention is also applicable to other information processing apparatuses such as a personal computer. Additionally, in the present embodiment, although wireless communication based on NFC is explained as one example of near field wireless communication, the present invention is not limited thereto, and a wireless communication of any standard may be used. Thus, the present invention is also not limited to the non-contact wireless communication units included in each of the mobile terminal 10 and the image forming apparatus 20.

The mobile terminal 10 is a mobile phone such as a smartphone, a tablet computer, a laptop computer, and the like. A controller 100 provided in the mobile terminal 10 is electrically connected to the non-contact wireless communication unit (reader/writer) 11 and a UI unit 12, and controls them. The image forming apparatus 20 is an MFP (Multi Functional Peripheral) provided with a plurality of functions.

A controller 200 provided in the image forming apparatus 20 is electrically connected to the non-contact wireless communication unit (tag) 21, the non-contact wireless communication unit (card reader) 22, a printer section 23, a scanner section 24, and a UI unit 25, and controls them. The IC card 30 is an employee ID card or a membership card storing information such as user information and electronic money. The non-contact wireless communication unit (tag) 31 is embedded in a card shape, and the stored information is read and written by a dedicated reader/writer, and the IC card 30 does not operate actively.

Additionally, the non-contact wireless communication unit (reader/writer) 11 of the mobile terminal 10 can realize a function that is equivalent to the IC card 30 by using the card emulation function to be described below. The details of each function will be described with reference to FIGS. 2 and 3. Additionally, the IC card 30 is configured by only a tag, so the detailed explanation thereof will be omitted.

Figure 2:
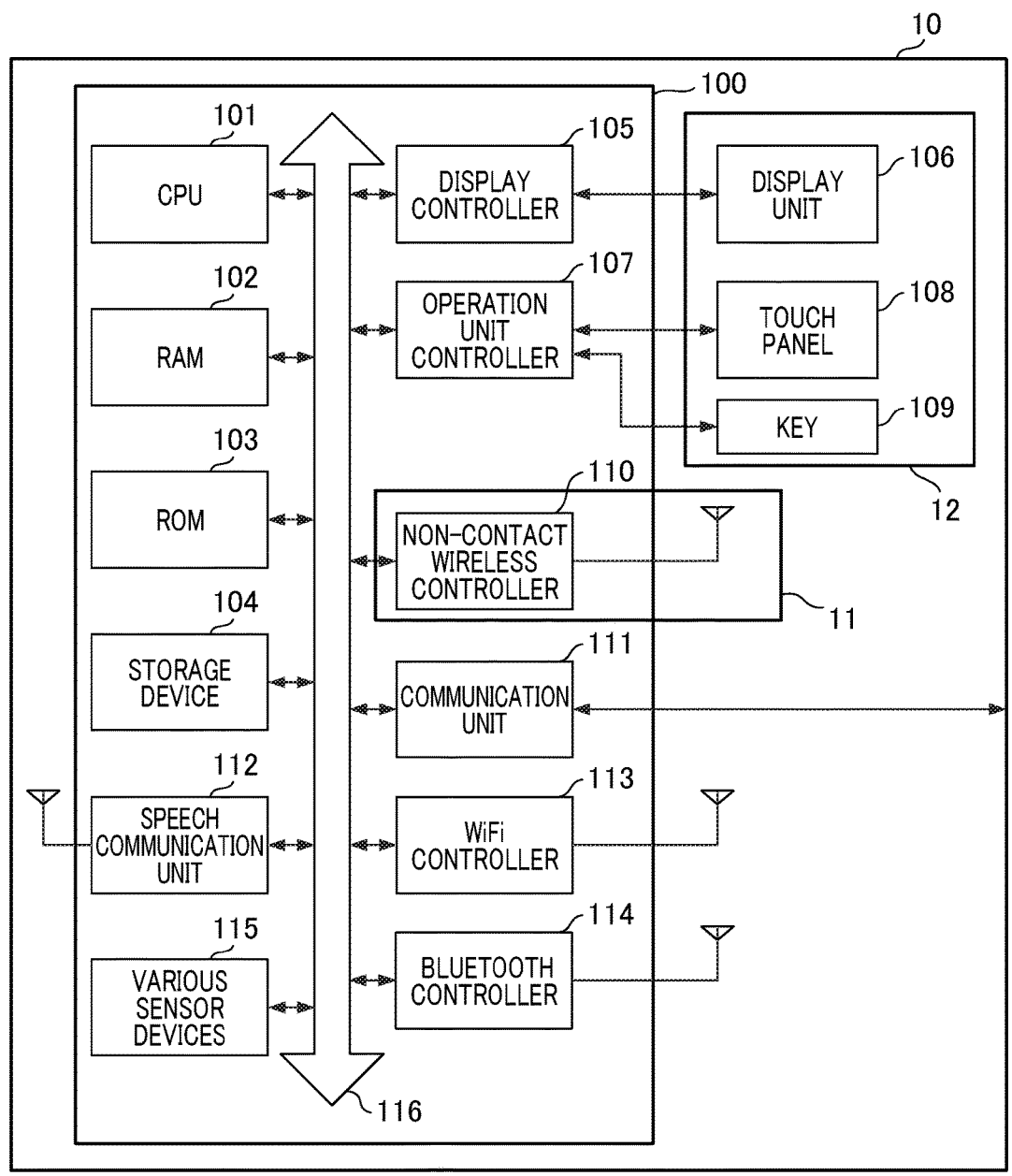
FIG. 2 is a block diagram illustrating a hardware configuration of a mobile terminal.

FIG. 2 is a block diagram illustrating a hardware configuration of the mobile terminal 10. The blocks shown in FIG. 2 operate simultaneously with each other and realize the functions of the mobile terminal 10. A CPU 101 of the controller 100 is a central calculating unit that controls the entire mobile terminal 10, and is connected to the blocks via a system bus 116. A RAM 102 is a work memory in which the CPU 101 operates, and stores calculation data of the CPU 101 and various programs.

A ROM 103 stores programs used by the CPU 101, image data, applications that operate in cooperation with the image forming apparatus 20, and the like. A storage device 104 is a nonvolatile secondary storage device for storing programs and data having a large size. The storage device 104 is, for example, an SD card or a memory device that conforms to SSD standards and the like, or may be a part of the region of the ROM 103. The programs and data stored in the storage device 104 are deployed in the RAM 102 and used.

A display unit 106 performs various displays by a display controller 105. Additionally, a touch panel 108 and a key 109 perform various operations by an operation unit controller 107. The display unit 106 and the touch panel 108 are configured to be operable in conjunction with each other. The user can execute the application described in the present embodiment by operating each block belonging to the UI unit 12.

A non-contact wireless controller 110 controls touch communication via an antenna. The non-contact wireless controller 110 is an interface conforming to standards that executes communication by touch of an NFC reader/writer and the like. The non-contact wireless controller 110 transmits and receives authentication data of a user for logging into the image forming apparatus 20, an IP address for executing communication using a WiFi controller 113, and the like. Additionally, the non-contact wireless controller 110 performs control that switches communication modes of the present invention. The non-contact wireless communication unit (reader/writer) 11 described with reference to FIG. 1 is configured by the non-contact wireless controller 110 and an antenna unit.

A communication unit 111 performs communication via a route different from that of the non-contact wireless controller 110 and the like. The communication unit 111 is, for example, a USB and a communication interface conforming to unique standards. A speech communication unit 112 is configured to operate as a telephone by connecting to a microphone and a speaker (not illustrated) and by connecting to a public line.

The WiFi controller 113 is a communication interface that is distinguished from the non-contact wireless controller 110 in order to perform communication with an external apparatus such as the image forming apparatus 20 by wireless LAN standards at a distance, rather than touch. A Bluetooth controller 114 is a communication interface that is distinguished from the non-contact wireless controller 110 in order to perform communication with the external apparatus such as the image forming apparatus 20 by the Bluetooth (registered trademark) standards at a distance, rather than touch.

Various sensor devices 115 are sensors used for various applications installed in the mobile terminal 10. Analog data obtained by each sensor is digitally converted, and the obtained data is managed as a predetermined parameter in the RAM 102. The various sensor devices 115 are, for example, a temperature sensor, a pressure sensor, an illuminance sensor, a proximity sensor, and the like. In the present embodiment, parameters obtained by an acceleration sensor, a magnetic sensor, a tilt sensor, and the like are used. The sensor devices may be incorporated in the CPU 101 or mounted as a single sensor device. The configuration thereof is not limited and, here, it is described together for convenience.

Figure 3:
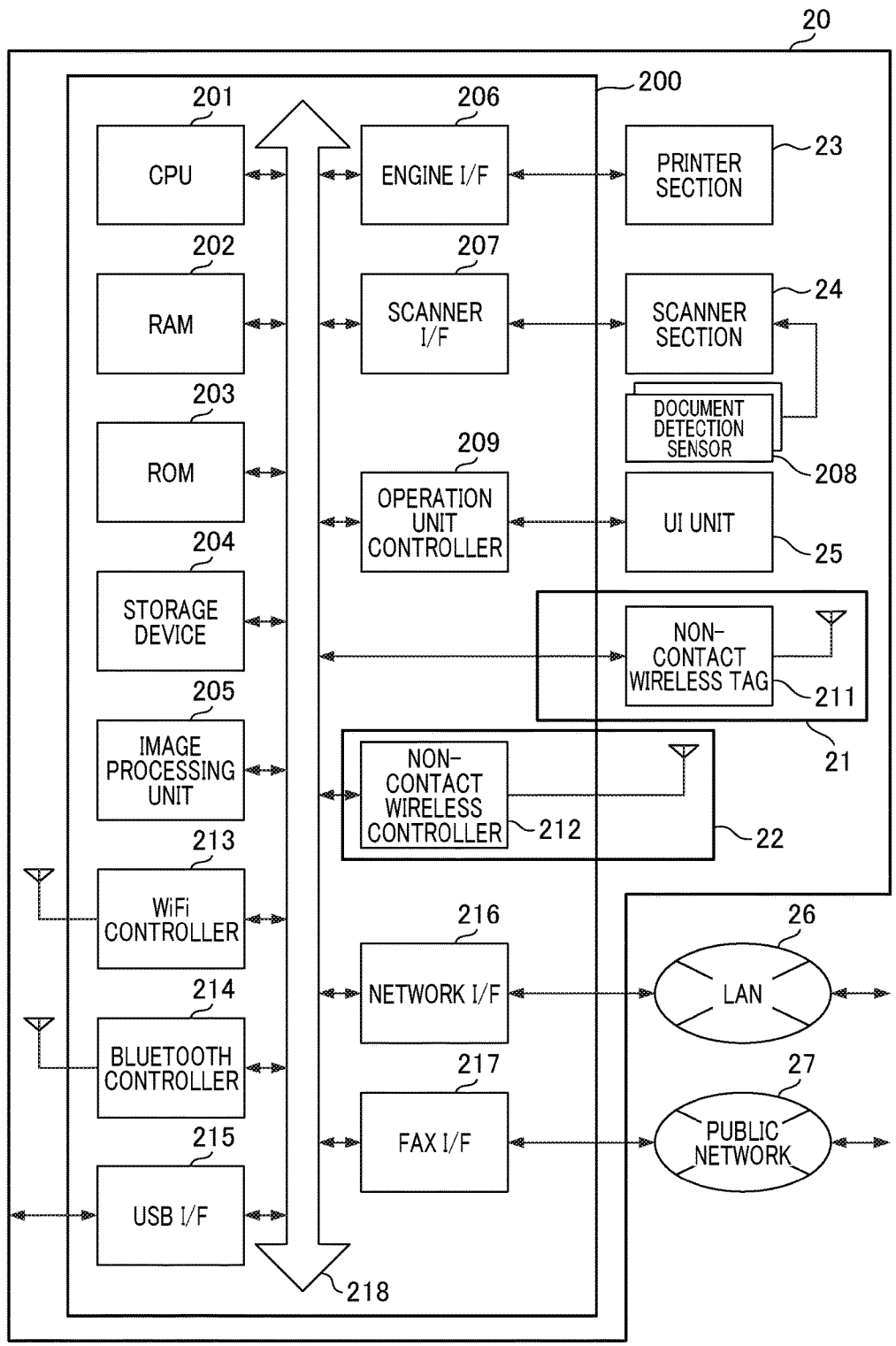
FIG. 3 is a block diagram illustrating a hardware configuration of an image forming apparatus.

FIG. 3 is a block diagram illustrating a hardware configuration of the image forming apparatus 20. Note that, for convenience of explanation, a block showing a part of the external environment is also illustrated in FIG. 3. The image forming apparatus 20 is provided with the controller 200, the printer section 23, the scanner section 24, the UI unit 25, the non-contact wireless communication unit (tag) 21, and the non-contact wireless communication unit (card reader) 22 and the like. These blocks operate in conjunction with each other and realize the functions of the image forming apparatus 20, including printing, scanning, copying, FAXing, and the like.

A CPU 201 of the controller 200 is a central calculating unit that controls the entire image forming apparatus 20, and is connected to each block via a system bus 218. A RAM 202 is a work memory on which the CPU 201 operates, and stores calculation data of the CPU 201 and various programs.

Additionally, the RAM 202 is also used as an image memory that holds image data that has undergone various image processes by an image processing unit 205 during, for example, printing. A ROM 203 stores programs used by the CPU 201, image data, setting data, and the like.

A storage device 204 is a nonvolatile secondary storage device for storing programs and data having a large size. The storage device 204 is, for example, a memory device conforming, for example, to HDD standards and SSD standards, and may be a part of the region of the ROM 203. The programs and data stored in the storage device 204 are deployed into the RAM 202 and used. The printer section 23 prints print data. The scanner section 24 reads (scans) a document. In the UI unit 25, various setting operations and the display of alarms and the like are performed.

A document detection sensor 208 that detects a document is connected to the scanner section 24. The document detection sensor 208 is provided with each of a pressure plate section (document table scanner section) and an ADF section (Auto Document feeder section). If a document is placed on a document table glass, the document detection sensor 208 provided in the pressure plate section detects that the document has been placed and reports this to the CPU 201 via the scanner section 24 and a scanner I/F 207. If the document is placed on a feeder, the document detection sensor 208 provided in the ADF unit detects that the document has been placed and reports this to the CPU 201 via the scanner section 24 and the scanner I/F 207 in a similar state.

Additionally, the scanner section 24 that has received an execution command from the controller 200 optically reads a document image, converts the image into image data, and transmits the data to the controller 200. The printer section 23 performs data communication with the controller 200 via an engine I/F 206. The printer section 23 that has received the data from the controller 200 feeds a sheet, prints the image data on the fed sheet, and discharges the printed sheet. The UI unit 25 performs data communication with the controller 200 via an operation unit controller 209. The operation unit controller 209 may be provided in the UI unit 25.

Communication with the external environment is performed via each external I/F. Hereinafter, a specified description will be given. A non-contact wireless tag 211 is induced by a magnetic field generated by an external NFC reader/writer and the like (for example, the non-contact wireless communication unit (reader/writer) 11) via an antenna, generates an electric power, and performs communication. Additionally, the non-contact wireless tag 211 has an interface for performing the setting from the CPU 201 not via the NFC reader/writer.

For example, the interface is a general-purpose interface such as I2C (Inter-Integrated Circuit) and SPI (Serial Peripheral Interface). In the non-contact wireless tag 211, P2P communication using this can be implemented as a function. In the present embodiment, it is basically assumed that the non-contact wireless tag 211 is an NFC tag that operates as a passive tag.

A non-contact wireless controller 212 controls touch communication via an antenna. The non-contact wireless controller 212 is a reader functional unit that mainly performs reading by generating a magnetic field and performing data communication with a passive tag in the IC card held over by the user and with NFC of the card emulation function (mode). In the present embodiment, it is assumed that the non-contact wireless controller 212 is an NFC card reader. The non-contact wireless communication unit (tag) 21 and the non-contact wireless communication unit (card reader) 22 are connected to the controller 200 via the system bus 218, a dedicated port (for example, a USB connector and the like) can be provided and may be of any configuration that allows retrofitting.

A WiFi controller 213 is a communication interface that is distinguished from a module unit that performs non-contact wireless communication for performing communication by the wireless LAN standard at a distance via the antenna, rather than touch. A Bluetooth controller 214 is a communication interface that is distinguished from a non-contact wireless communication module unit for performing communication by the Bluetooth standards at a distance via the antenna, rather than touch. A USB I/F 215 is connected to information processing equipment such as a personal computer (not illustrated) (hereinafter referred to as a "PC") with a USB cable via a USB connector, and performs a USB communication.

A network I/F 216 is connected to a LAN 26 via a LAN I/F connector, and performs network communication with a communication destination PC. A wireless LAN access point (not illustrated) is also connected to the LAN 26, and it is also possible to perform network communication with the mobile terminal 10 and the PC via an antenna connected to the WiFi controller 213. A FAX I/F 217 is connected to a public network 27 via a modular jack, and performs facsimile transmission/reception with a facsimile machine of the communication destination.

Figure 4:
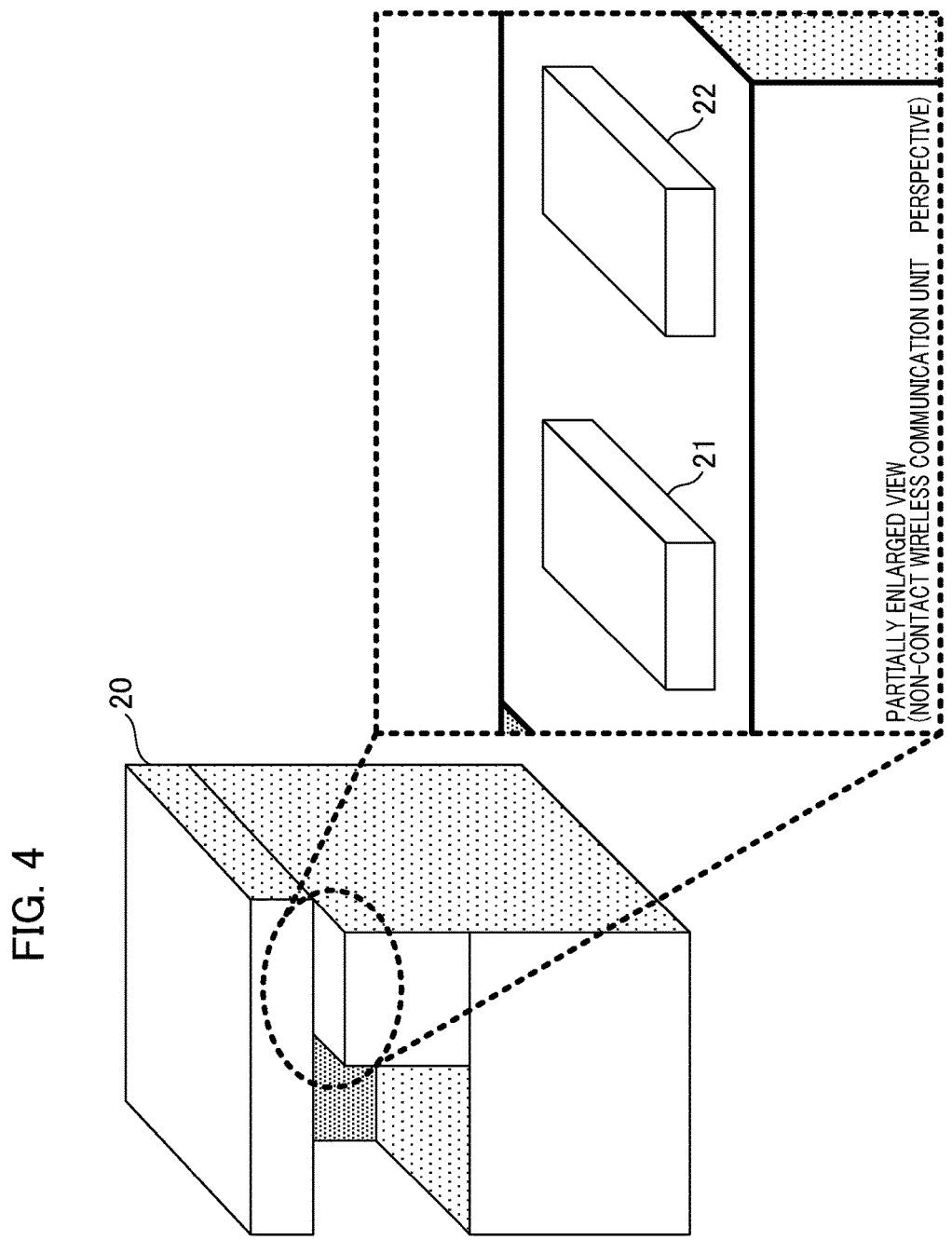
FIG. 4 illustrates an arrangement of NFC devices in the image forming apparatus.

FIG. 4 illustrates an arrangement of the non-contact wireless communication unit (tag) 21 and the non-contact wireless communication unit (card reader) 22 that are NFC devices (near field communication units) of the image forming apparatus 20 according to the present embodiment. As shown in the drawing, the non-contact wireless communication unit (tag) 21 and the non-contact wireless communication unit (card reader) 22 of the image forming apparatus 20 are arranged side by side. Note that the arrangement shown in FIG. 4 is an example in which different types of the NFC devices are arranged for convenience, and only one of these NFC devices may be used.

Figure 5:
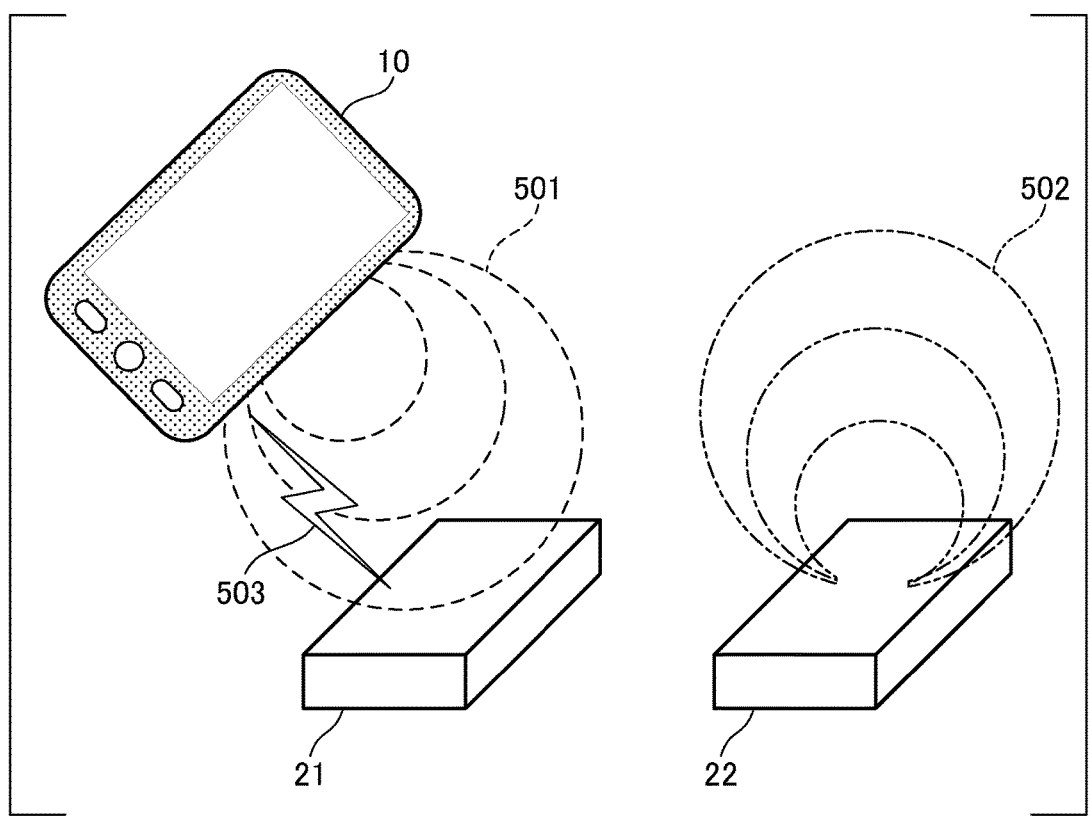
FIG. 5 illustrates a situation in which the mobile terminal is held over the NFC devices of the image forming apparatus.

FIG. 5 is a schematic diagram illustrating a situation if the mobile terminal 10 is held over the non-contact wireless communication unit (tag) 21 and the non-contact wireless communication unit (card reader) 22 of the image forming apparatus 20. A magnetic field 501 conveniently represents a magnetic field generated by the non-contact wireless communication unit (reader/writer) 11 of the mobile terminal 10. The magnetic field 501 is a magnetic field generated by the non-contact wireless communication unit (reader/writer) 11 for communicating with the NFC tag and another NFC reader/writer. Since FIG. 5 is a conveniently rendered drawing, the shape and appearance of the magnetic field is different from the actual one.

Similarly, a magnetic field 502 conveniently represents the magnetic field generated by the non-contact wireless communication unit (card reader) 22 of the image forming apparatus 20. The magnetic field 502 is a magnetic field generated by the non-contact wireless communication unit (card reader) 22 for communicating with a passive tag in the IC card held by the user and with the NFC of the card emulation function.

A NFC communication 503 conveniently shows that communication has been performed in response to the magnetic field externally received by the non-contact wireless communication unit (tag) 21. Specifically, the NFC communication 503 shows that communication is performed by the reaction of the NFC tag of the image forming apparatus 20 to the magnetic field 501 emitted from the non-contact wireless communication unit (reader/writer) 11 of the mobile terminal 10, which serves as the NFC device to work as the reader/writer function. The outline of the communication generation here will be described below with reference to FIG. 6.

Additionally, if the mobile terminal 10 is held over the non-contact wireless communication unit (card reader) 22 (not illustrated), the non-contact wireless communication unit (reader/writer) 11 of the mobile terminal 10 reacts as the NFC of the card emulation function and performs data communication. The non-contact wireless controller 110 of the mobile terminal 10 can switch between the reader/writer function, the card emulation function, and the P2P function.

Subsequently, the non-contact wireless controller 110 of the mobile terminal 10 reacts as the NFC of the card emulation function to the magnetic field 502 generated by the non-contact wireless communication unit (card reader) 22 of the image forming apparatus 20. The outline of the communication generating here will be described below with reference to FIG. 7.

In this way, the mobile terminal 10 can react to both NFC devices. Accordingly, it is desired, for example, that the mobile terminal 10 operates as the reader/writer function when brought close to the NFC tag of the image forming apparatus 20, and the mobile terminal 10 reacts as the card emulation function when brought close to the NFC reader. However, if, in the image forming apparatus 20, each NFC device is arranged as shown in FIG. 4, the NFC function that is different from the function (mode) that the user wants to use is enabled depending on the user's action, and an incorrect touch with an unnecessary NFC device may occur.

For example, in FIG. 5, although the user wants to make the mobile terminal 10 touch the non-contact wireless communication unit (card reader) 22, the mobile terminal 10 may react with the non-contact wireless communication unit (tag) 21. In contrast, in the present embodiment, a mistaken operation of the mobile terminal 10 can be suppressed by executing the processes of FIG. 9 and subsequent steps.

Figure 6:
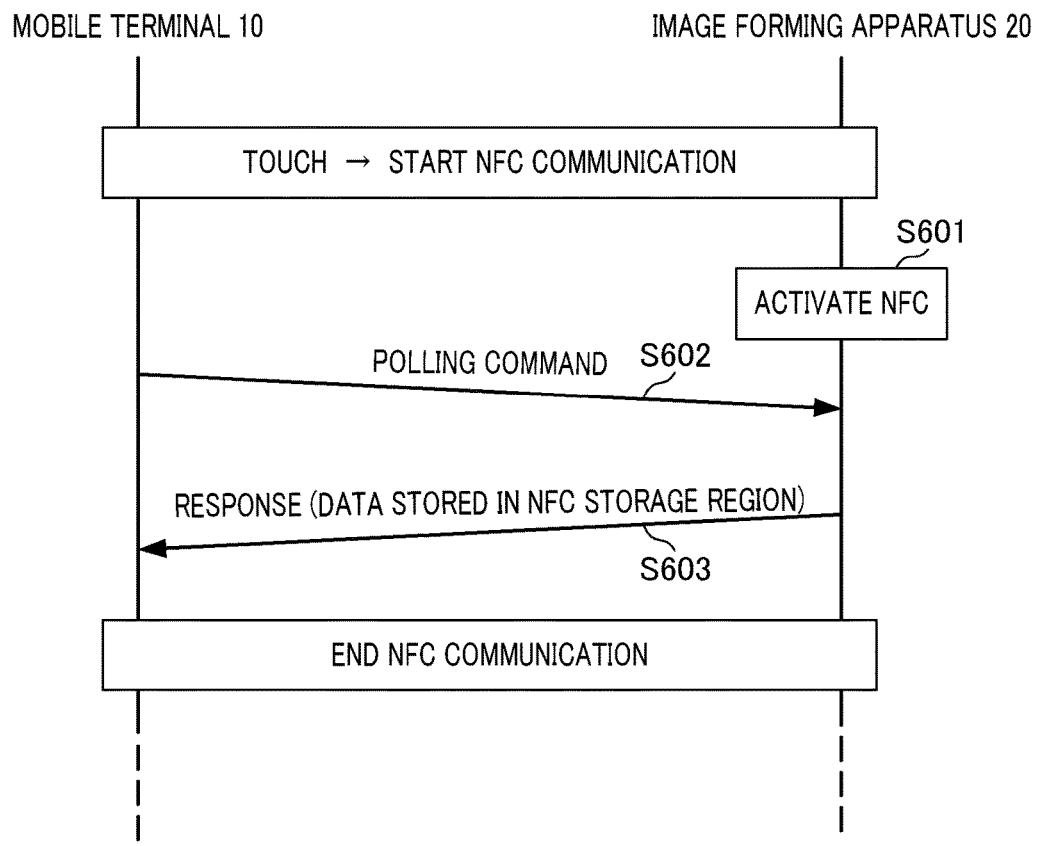
FIG. 6 illustrates a control procedure when the NFC device establishes communication.

FIG. 6 is a flowchart illustrating a series of control procedures that establishes communication by performing non-contact wireless communication between the NFC reader/writer and the NFC tag, in the present embodiment. In the example shown in FIG. 6, the non-contact wireless communication unit (reader/writer) 11 of the mobile terminal 10 and the non-contact wireless communication unit (tag) 21 of the image forming apparatus 20 perform non-contact wireless communication. The NFC is the proximity wireless communication standard utilizing electromagnetic waves of 13.56 MHz, which allows a bi-directional communication between the devices while maintaining interconnection with an existing non-contact IC card.

First, in step S601, if the user brings the mobile terminal 10 close to the non-contact wireless communication unit (tag) 21 of the image forming apparatus 20, the non-contact wireless communication unit (tag) 21 of the image forming apparatus 20 is activated in the magnetic field 501 generated by the mobile terminal 10. In step S602, the non-contact wireless communication unit (reader/writer) 11 of the mobile terminal 10 transmits a Polling command to the non-contact wireless communication unit (tag) 21 of the image forming apparatus 20.

In step S603, the image forming apparatus 20 transmits response data by changing a load in the non-contact wireless communication unit (tag) 21. The data to be transmitted at this time is information in NDEF (NFC Data Exchange Format) stored in the storage region of the NFC device. The contents to be stored can be optionally determined on the transmitting (providing) data side, and a user who has the NFC reader/writer also can rewrite the contents. However, for security reasons, it is also possible to restrict external writing if rewriting of the contents stored on the application side by the user may cause trouble.

Figure 7:
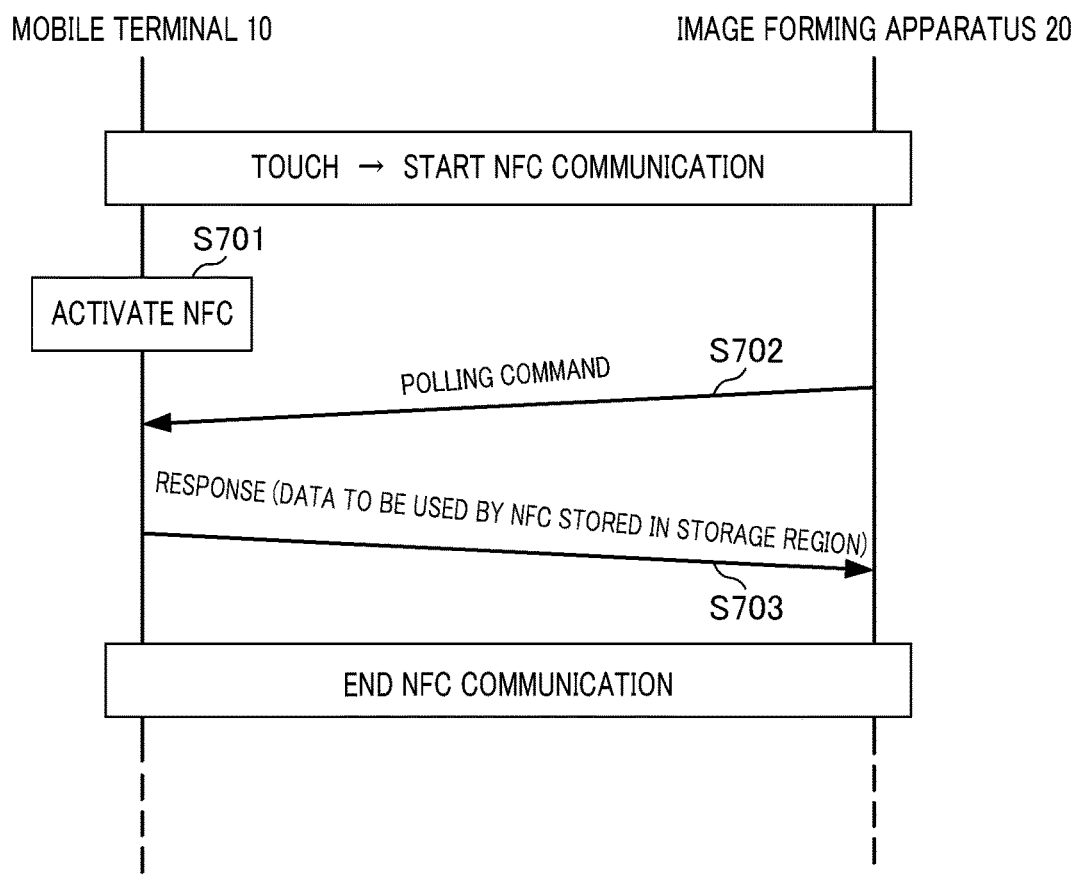
FIG. 7 illustrates a control procedure when the NFC device establishes communication.

FIG. 7 is a flowchart illustrating a series of control procedures that establishes communication by performing a non-contact wireless communication between the NFC reader/writer and the NFC card reader, in the present embodiment. In the example shown in FIG. 7, as the NFC of the card emulation function, the non-contact wireless communication unit (reader/writer) 11 of the mobile terminal 10 performs non-contact wireless communication with the non-contact wireless communication unit (card reader) 22 of the image forming apparatus 20.

In step S701, when the user brings the mobile terminal 10 close to the non-contact wireless communication unit (card reader) 22 of the image forming apparatus 20, the terminal 10 is activated in response to the magnetic field 502 generated by the noncontact wireless communication unit (card reader) 22. That is, the non-contact wireless controller 110 of the mobile terminal 10 operates with the card emulation function with respect to the access by the NFC card reader. In step S702, the non-contact wireless communication unit (card reader) 22 transmits a Polling command to the non-contact wireless communication unit (reader/writer) 11 of the mobile terminal 10.

In step S703, the mobile terminal 10 transmits data of a response corresponding to NFC standards. The data to be transmitted at this time may be data stored in the storage region of the NFC or data stored in the ROM 103 of the mobile terminal 10. This is a difference between the NFC reader/writer and the NFC tag, that is, a different point in steps S603 and S703. The above is a basic flow of the NFC communication used in the present embodiment.

Next, in the mobile terminal 10 according to the present embodiment, the control for suppressing a mistaken operation and executing a wireless communication in a desired operation mode will be described with reference to FIG. 8, FIG. 9, FIGS. 10A to 10C, FIGS. 11A to 11C, and FIGS. 12A to 12C.

In the present embodiment, the non-contact wireless communication is NFC communication, and a description will be given on the premise of the following setting with reference to FIG. 8, FIG. 9, FIGS. 10A to 10C, FIGS. 11A to 11C, and FIGS. 12A to 12C. Specifically, "device information" and "information for handover to another interface" are stored in the NDEF format in the storage region of the non-contact wireless tag 211 of the non-contact wireless communication unit (tag) 21 of the image forming apparatus 20.

In contrast, the contents of data (expected data) transmitted and received by the mobile terminal 10 through NFC communication may be various ones, depending on the application to be used. Since the configuration of the application is unlimited and may be freely chosen, the expected data is also not limited to the example described above and is freely configured. The present invention is applicable to each case of the expected data.

Figure 8:
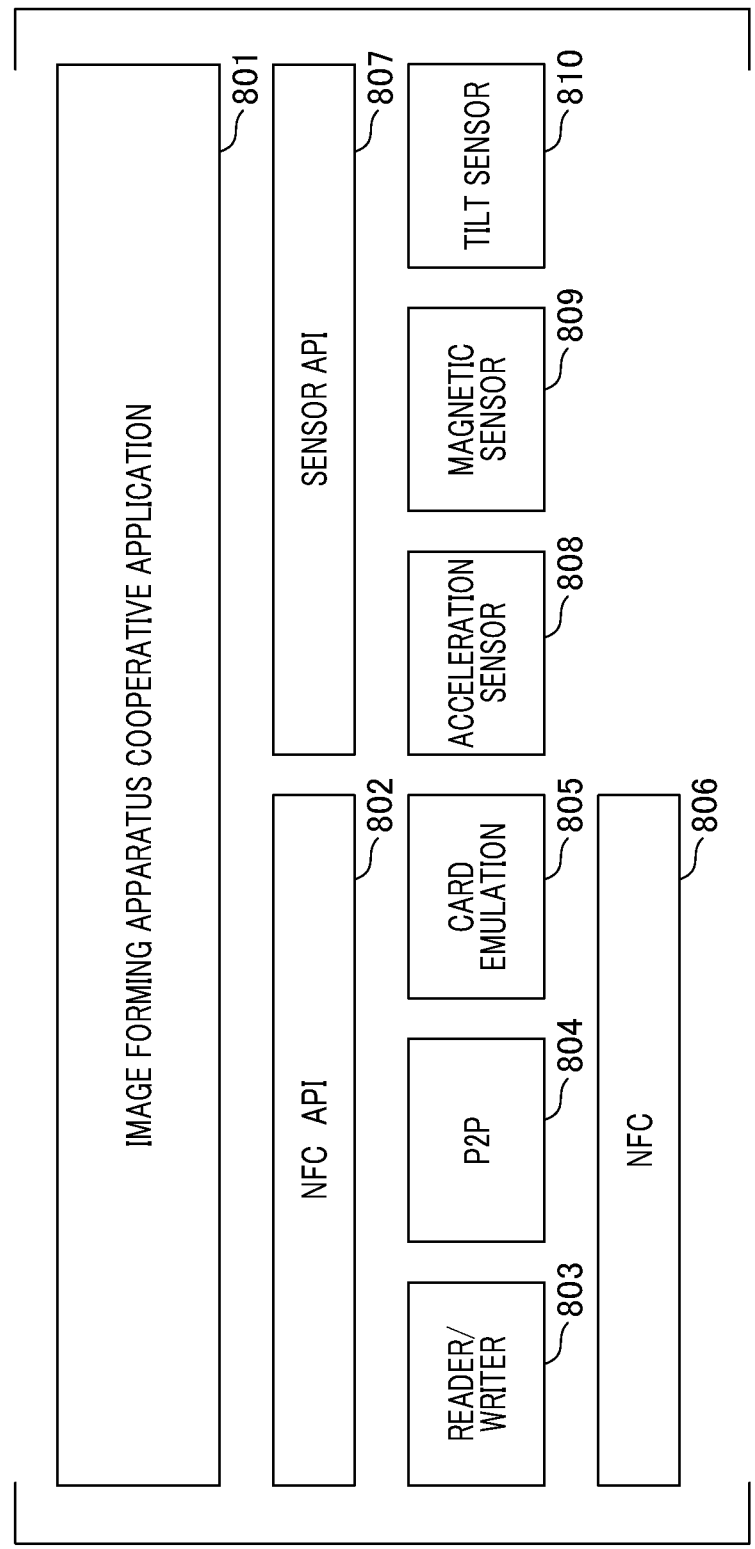
FIG. 8 illustrates a functional block of the mobile terminal.

FIG. 8 illustrates a functional block of the mobile terminal 10. An application executed in the present embodiment is referred to as an image forming apparatus cooperative application 801 (hereinafter, referred to as the "cooperative application 801"). The cooperative application 801 is a program stored in the ROM 103 or the storage device 104 of the controller 100 shown in FIG. 2, which are included in the mobile terminal 10. The process of the cooperative application 801 to be described below is realized by executing the program by the CPU 101 after the program has been deployed in the RAM 102.

The CPU 101 controls an NFC 806 by using a reader/writer function 803, a P2P function 804, and a card emulation function 805, via an NFC API 802, based on the program. The sensor API 807 to the tilt sensor 810 are the functions used in the third embodiment and the fourth embodiment, and a description thereof will be omitted here.

FIG. 9 is a flowchart illustrating the operation of the cooperative application 801 of the mobile terminal 10 according to the present embodiment. In the process shown in FIG. 9, the cooperative application 801 performs control including the non-contact wireless controller 110 and the like, which serves as an NFC reader/writer. Additionally, one example of the screen displayed on the display unit 106 of the UI unit 12 if the cooperative application 801 is operated is shown in FIGS. 10A to 10C, FIGS. 11A to 11C, and FIGS. 12A to 12C.

First, in step S901, the cooperative application 801 is activated and process starts. In step S902, when the cooperative application 801 is activated, the cooperative application 801 determines whether or not the NFC function is enabled. If the NFC function is not enabled, the process proceeds to step S903, and the cooperative application 801 enables the NFC function. That is, in response to the activation of the cooperative application 801, the NFC 806 is automatically enabled via the NFC API 802. Additionally, as shown in FIG. 10A, a pop-up display 1001 may be performed to urge the user to change (enable) the setting, rather than performing an automatic control.

In step S904, the cooperative application 801 enables the card emulation function and disables the reader/writer function. Specifically, in a manner similar to the process of step S902, in response to the activation of the cooperative application 801 and the enabling of the NFC function, the switching of each function (operation mode) of NFC to be automatically enabled via the NFC API 802 is controlled. Additionally, rather than performing an automatic control, a pop-up display 1002 may be performed as shown in FIG. 10B to urge the user to change the setting (switching of the function to be enabled).

The process of step S904 is performed for the following reason. Login (ID authentication) is necessary for using the image forming apparatus 20 at the normal time after the activation of the cooperative application 801. Hence, it is necessary to have the non-contact wireless communication unit (card reader) 22 of the image forming apparatus 20 read the ID information of the mobile terminal 10 via the non-contact wireless communication unit (reader/writer) 11.

Accordingly, in the mobile terminal 10, the card emulation function that is usable for ID authentication is enabled. Then, as shown in FIG. 5, in the image forming apparatus 20, the reader/writer function is disabled (mask) so as to prevent the reaction of the non-contact wireless communication unit (card reader) 11 of the mobile terminal 10 to the non-contact wireless communication unit (tag) 21, which are arranged adjacent to each other.

Figure 10C:
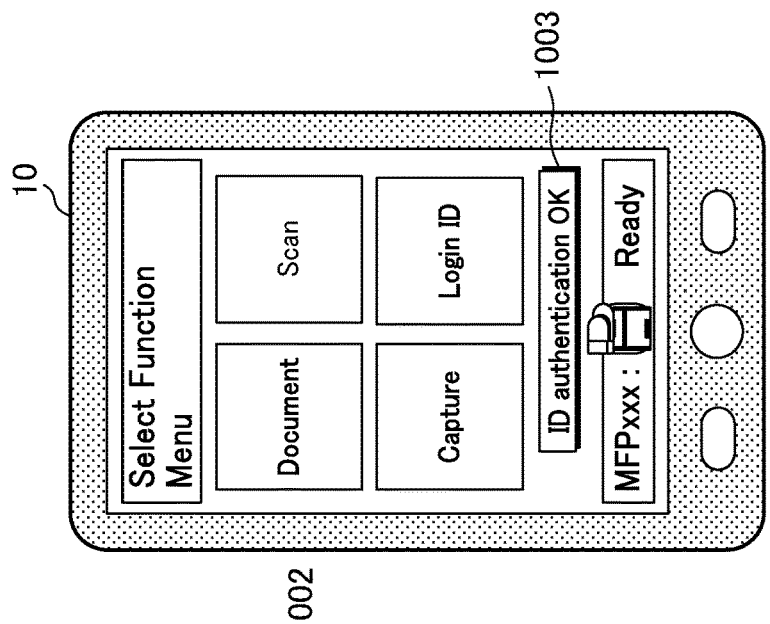
FIGS. 10A to 10C each illustrate an example of a screen displayed on the mobile terminal.
Figure 10B:
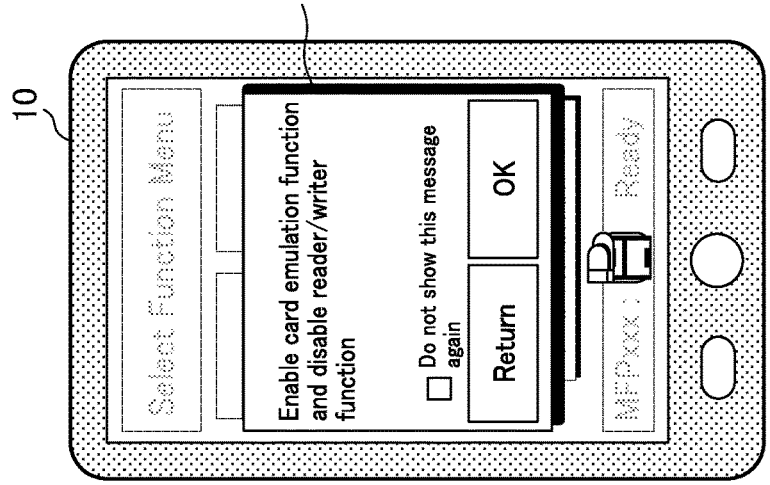
Figure 10A:
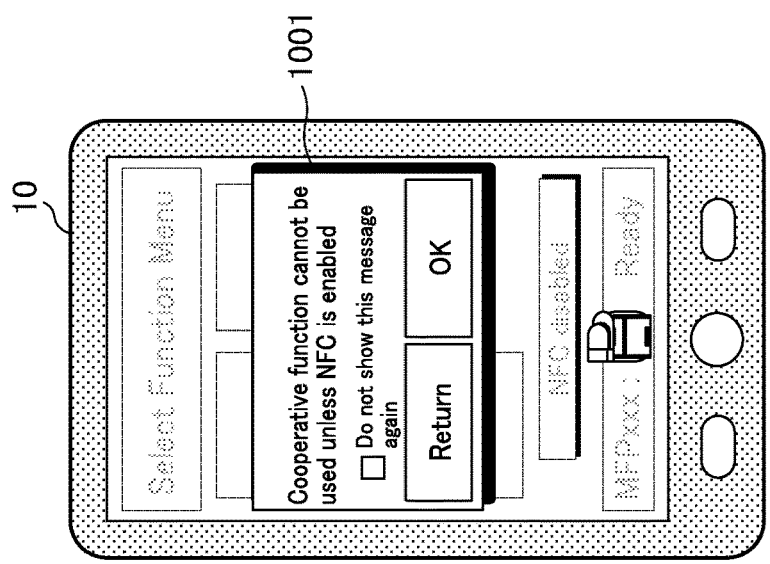

In step S905, the cooperative application 801 explicitly displays on the display unit 106 of the UI unit 12 that the function using the card emulation function can be used, as shown by, for example, a display 1003 of FIG. 10C. Note that in the example shown in FIG. 10C, a menu corresponding to the usable function is displayed. However, the present invention is not limited thereto, and, for example, a message indicating that the card emulation function can be used may be used.

In step S906, the cooperative application 801 determines whether or not the user has operated the UI unit 12 to make a transition to a menu (screen) requiring the reader/writer function. For example, if the user presses the "Document" menu in FIG. 10C to transition to the screen shown in FIG. 11A, the cooperative application 801 determines that the transition to the menu requiring the reader/writer function has been performed.

If it is determined that the transition to the menu requiring the reader/writer function has been performed, in other words, if the functions of NFC to be operated is required to be switched in the previous menu of the transition destination, the process proceeds to step S907. If it is determined that the transition to the menu requiring the reader/writer function has not been performed, in other words, if the switching of the operation functions of NFC is not required, the process proceeds to step S909. Here, the switching of functions of NFC to be operated is performed using the preview display as a starting point.

Figure 11A:
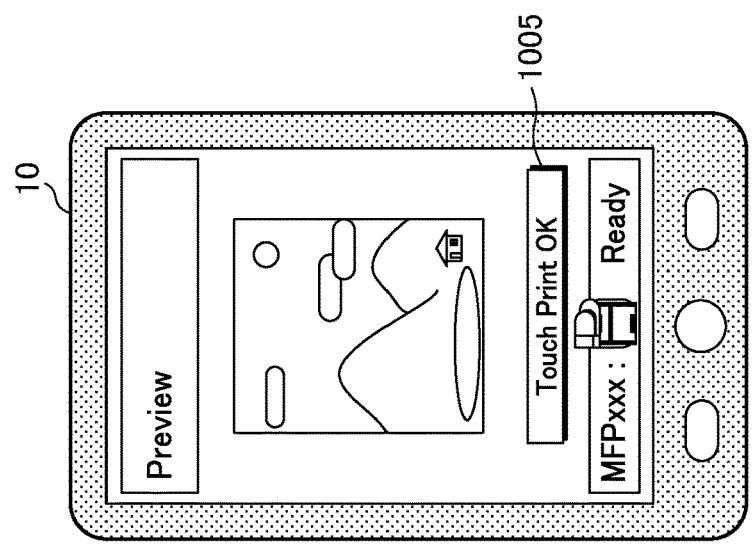
FIGS. 11A to 11C each illustrate an example of the screen displayed on the mobile terminal.
Figure 11B:
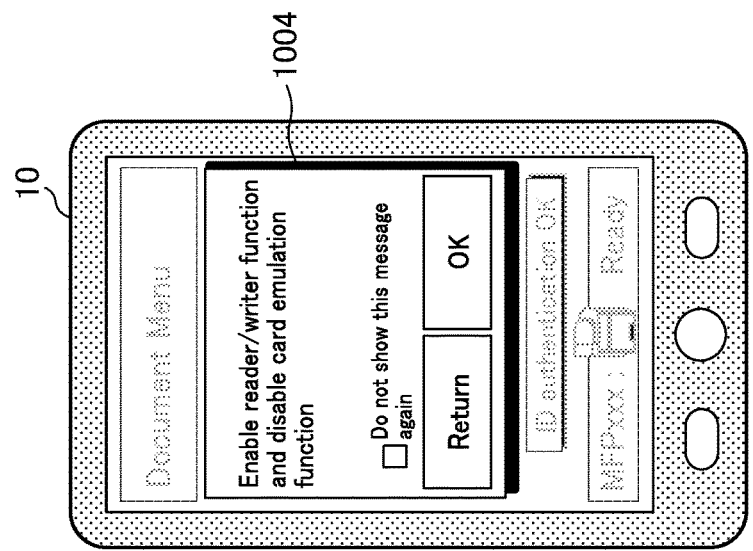

In step S907, the cooperative application 801 enables the reader/writer function and disables the card emulation function. Here, in a manner similar to the processes in steps S902 and S904, the switching of each function of NFC to be automatically enabled via the NFC API 802 is controlled by the cooperative application 801. Additionally, rather than such an automatic control, a pop-up display 1004 may be performed as shown in FIG. 11B to urge the user to change the setting (switching of the function to be enabled).

Figure 11C:
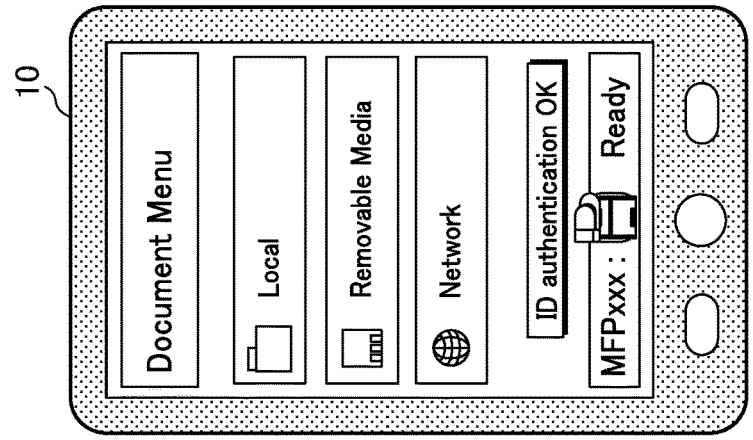

In step S908, the cooperative application 801 explicitly displays on the display unit 106 of the UI unit 12 that the function using the reader/writer function can be used, as shown by, for example, a display 1005 of FIG. 11C. In the example shown in FIG. 11C, the user touches the non-contact wireless communication unit (tag) 21 of the image forming apparatus 20 in order to print a preview image by the image forming apparatus 20, so that connection information of the interface for data communication is read.

Note that, here, WiFi is used as an interface for data communication. Connection information such as IP address and SSID necessary for WiFi handover is stored in the NFC tag of the image forming apparatus 20. The mobile terminal 10 that has read the connection information establishes communication using WiFi via the WiFi controller 113 with the image forming apparatus 20. The cooperative application 801 transmits the image data held by the mobile terminal 10 to serve as print data by WiFi communication.

As described above, since there is a possibility of reading the NFC tag if the transition to the screen that performs preview display has been performed, the cooperative application 801 determines that transition to the menu that requires the reader/writer function and enables the reader/writer function has been performed. Then, as shown in FIG. 5, in the image forming apparatus 20, the card emulation function is disabled (masked) so as to prevent the reaction of the non-contact wireless communication unit (card reader) 22, which are arranged adjacent to each other.

In step S909, the cooperative application 801 determines whether or not the user has operated the UI unit 12 and the transition to the next menu has been performed. If it is determined that the transition to the next menu has not been performed, the process proceeds to step S911. In contrast, if it is determined that the transition to the next menu has been performed, the process proceeds to step S910. In step S910, the cooperative application 801 determines whether or not the transition to the menu requiring the card emulation function has been performed.

If it is determined that the transition the menu requiring the card emulation function has been performed, the process returns to step S904, and the process that enables the card emulation function is repeated. In contrast, if it is determined that the transition to the menu requiring the card emulation function has not been performed, the process proceeds to step S911.

In step S911, it is determined whether or not the cooperative application 801 has ended. If it is not determined that the cooperative application 801 has ended, the process returns to step S909, and it is determined whether or not the transition to the menu requiring the switching of functions of NFC to be operated has been performed. If it is determined that the cooperative application 801 has ended, the process of FIG. 9 ends. Note that in the case the cooperative application 801 operating in the background, selecting "the cooperative application 801 has ended" or "the cooperative application 801 has not ended" may be optional, and either of them can be realized.

As described above, according to the present embodiment, it is possible to appropriately control the mode by which the non-contact wireless communication unit (reader/writer) 11 operates in accordance with the display contents displayed on the screen of the mobile terminal 10. As a result, a mistaken operation can be suppressed and a wireless communication can be executed in a desired operation mode.

Second Embodiment

In the first embodiment, since the login (authentication) is required to use the image forming apparatus 20 after the activation of the cooperative application 801, first, the function of NCF is controlled so as to enable the card emulation function. In contrast, in the second embodiment, a description will be given of a case where the reader/writer function is enabled assuming that the WiFi handover and the like are executed at the normal time when the cooperative application 801 is being activated. Note that since the configuration of each device in the present embodiment is the same as that of the first embodiment, its explanation will be omitted.

Figure 13:
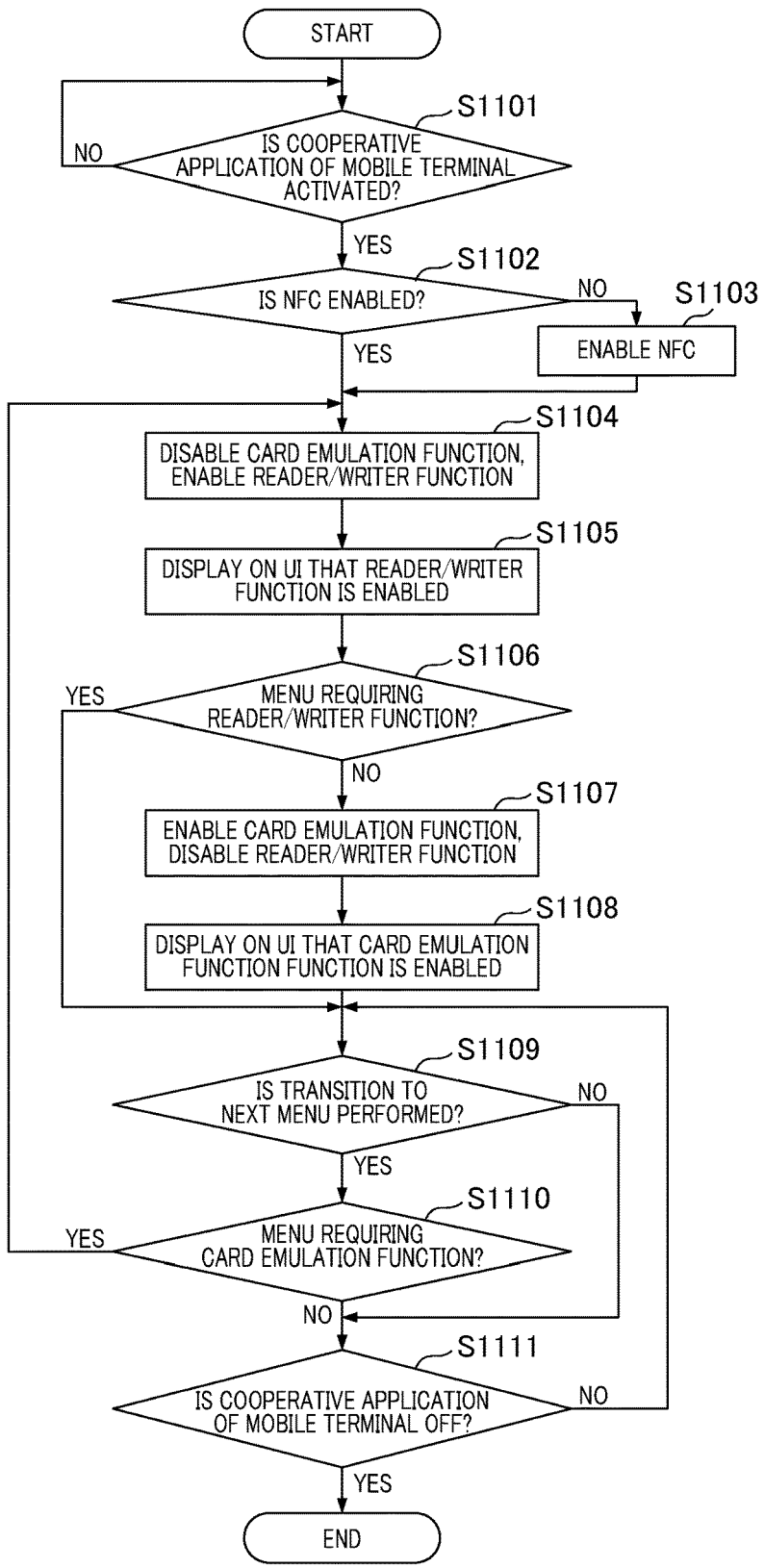
FIG. 13 is a flowchart illustrating the operation of the cooperative application 801 of the mobile terminal.

FIG. 13 is a flowchart illustrating the operation of the cooperative application 801 of the mobile terminal 10 according to the present embodiment. Steps S1101 to S1103 are the same as the processes of steps S901 to S903 of FIG. 9 described in the first embodiment, so the description thereof will be omitted.

Figure 12A:
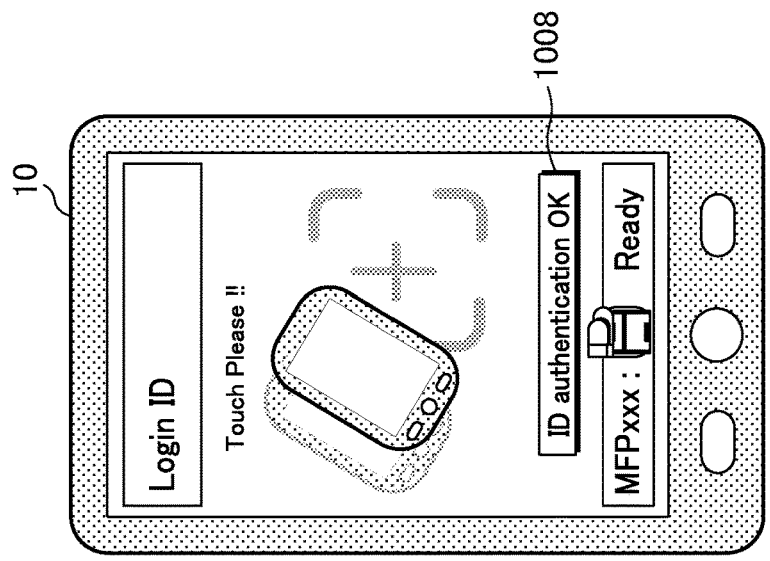
FIGS. 12A to 12C each illustrate an example of the screen displayed on the mobile terminal.

In step S1104, the cooperative application 801 enables the reader/writer function and disables the card emulation function. That is, the switching of each function of the NFC to be automatically enabled via the NFC API 802 is controlled in response to the activation of the cooperative application 801 and the enabling of the NFC function. Additionally, instead of such automatic control, a pop-up display 1006 is performed as shown in FIG. 12A to urge the user to change the setting.

Figure 12B:
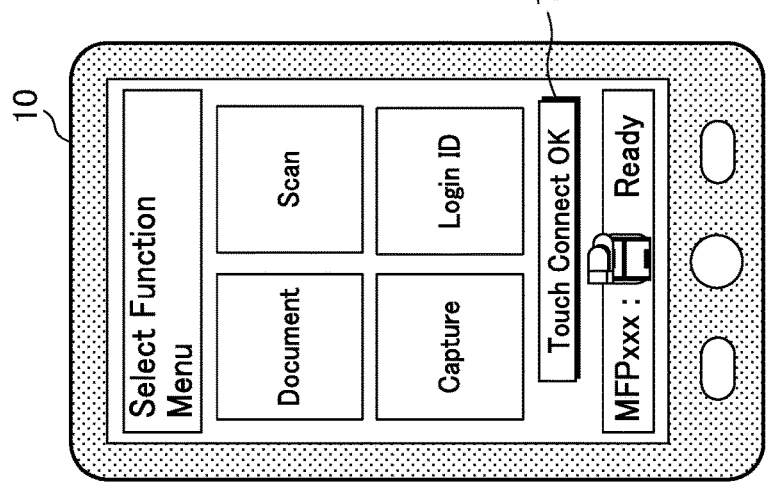

In step S1105, the cooperative application 801 explicitly displays on the display unit 106 of the UI unit 12 that the reader/writer function is enabled, that is, that the function using the reader/writer function can be used, as shown by a display 1007 of FIG. 12B. Here, since the reader/writer function of the mobile terminal 10 is enabled, it is possible to read the non-contact wireless communication unit (tag) 21 of the image forming apparatus 20. Information necessary for the WiFi handover is stored in the NFC tag in a manner similar to the first embodiment. The mobile terminal 10 that has read the information can establish communication with WiFi via the WiFi controller 113 with the image forming apparatus 20.

In step S1106, the cooperative application 801 determines whether or not the user has operated the UI unit 12 to make a transition to the menu requiring the card emulation function. For example, if the user presses down the "Login ID" menu in FIG. 12B and the transition to the screen shown in FIG. 12C has been performed, the cooperative application 801 determines that the transition to the menu requiring the card emulation function has been performed.

If it is determined that the transition to the menu requiring the card emulation function has been performed, that is, if the switching of functions of NFC to be operated is required in the previous menu of the transition destination, the process proceeds to step S1107. In contrast, if it is determined that the transition to the menu requiring the card emulation function has not been performed, that is, if the switching of functions of NFC to be operated is not required, the process proceeds to step S1109. Here, the switching of functions of NFC to be operated is performed using the display of the "Login ID" menu as a starting point.

In step S1107, the cooperative application 801 enables the card emulation function and disables the reader/writer function. In a manner similar to step S1104, the switching of each function of NFC to be automatically enabled via the NFC API 802 is controlled by the cooperative application 801. Additionally, rather than such automatic control, the pop-up display 1002 may be performed as shown in FIG. 10B to urge the user to change the setting.

Figure 12C:
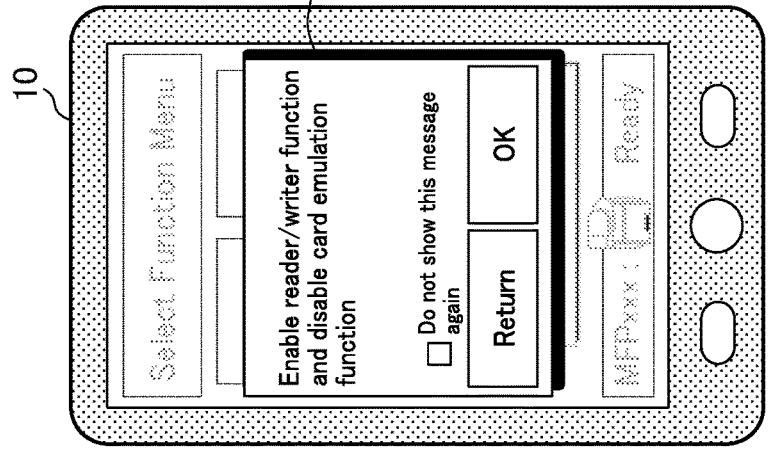

In step 1108, the cooperative application 801 explicitly displays on the display unit 106 of the UI unit 12 that the function using the card emulation function can be used, for example, as shown by a display 1008 of FIG. 12C. In the example shown in FIG. 12C, the user needs to login (ID authentication) in order to use the image forming apparatus 20. Hence, it is necessary to have the non-contact wireless communication unit (card reader) 22 of the image forming apparatus 20 read the ID information of the mobile terminal 10 via the non-contact wireless communication unit (reader/writer) 11.

Accordingly, in the mobile terminal 10, the card emulation function that can be used for ID authentication is enabled. Subsequently, as shown in FIG. 5, in the image forming apparatus 20, the reader/writer function is made disabled (mask) so as to prevent the reaction of the non-contact wireless communication unit (card reader) 11 of the mobile terminal 10 with the non-contact wireless communication unit (tag) 21, which are arranged adjacent to each other. Steps S1109 to S1111 are the same as the processes of steps S909 to S911 of FIG. 9 described in the first embodiment, so the description thereof will be omitted.

As described above, according to the present embodiment, in a manner similar to the first embodiment, the mode that operates in the non-contact wireless communication unit (reader/writer) 11 (function) can be appropriately controlled in accordance with the display contents displayed on the screen of the mobile terminal 10. As a result, a mistaken operation can be suppressed and a wireless communication can be executed in a desired operation mode.

According to the present embodiment, a process is realized in which the function of the NFC that is enabled after the activation of the cooperative application 801 starts in a state opposite to that of the first embodiment. That is, it suffices if the optimum wireless communication function is selected depending on the function implemented in the cooperative application 801, and the present invention is not limited to the above examples. For example, if the function implemented in the cooperative application 801 uses the P2P function of NFC, switching such that the P2P function operates in accordance with the menu displayed on the mobile terminal 10 is also possible.

Third Embodiment

In the present embodiment, the function of the NFC (operation mode) to be enabled in the mobile terminal is switched by using the arrangement of the NFC device(s) of the image forming apparatus 20. Specifically, the angle (orientation) at which the mobile terminal 10 is held (touch) changes in accordance with the arrangement of the NFC tag and the NFC reader/writer of the image forming apparatus 20. In the present embodiment, this function is used to determine the function of NFC to be operated in the mobile terminal 10.

The various sensor devices 115 are installed in the mobile terminal 10, and parameters obtained from the sensor devices 115 can be used. The cooperative application 801 uses the parameters obtained by the various sensor devices 115 via the sensor API 807 shown in FIG. 8. Specifically, the cooperative application 801 refers to the parameters obtained by an acceleration sensor 808, a magnetic sensor 809, and the tilt sensor 810 via the sensor API 807.

The acceleration sensor 808 can obtain an acceleration received at the right side (X axis) of the mobile terminal 10, an acceleration received at the upper side (Y axis) of the mobile terminal 10, and an acceleration received at the front side (Z axis) of the mobile terminal 10 to serve as acceleration parameters (unit m/s^ 2). The magnetic sensor 809 can obtain the magnetic strength parameters (unit uT) by setting the relation between the X, Y, and Z axes the same as in the case of the acceleration sensor 808.

The tilt sensor 810 can obtain the angle parameters (unit deg) for azimuth, pitch, and roll. Note that the method of obtaining the tilt (orientation) of the mobile terminal 10 is not limited in the present embodiment because the method recommended by the API may change, and the tilt (orientation) may be handled as tilt parameters that indicate horizontal orientation and vertical orientation.

As described above, in the present embodiment, the tilt of the mobile terminal 10 is determined based on the parameters indicating the horizontal and the vertical to determine in which orientation the mobile terminal 10 is touched to the image forming apparatus 20. Thereby, it is possible to execute wireless communication with an external apparatus in a desired operation mode in accordance with the action performed by the user without being aware.

Figure 14:
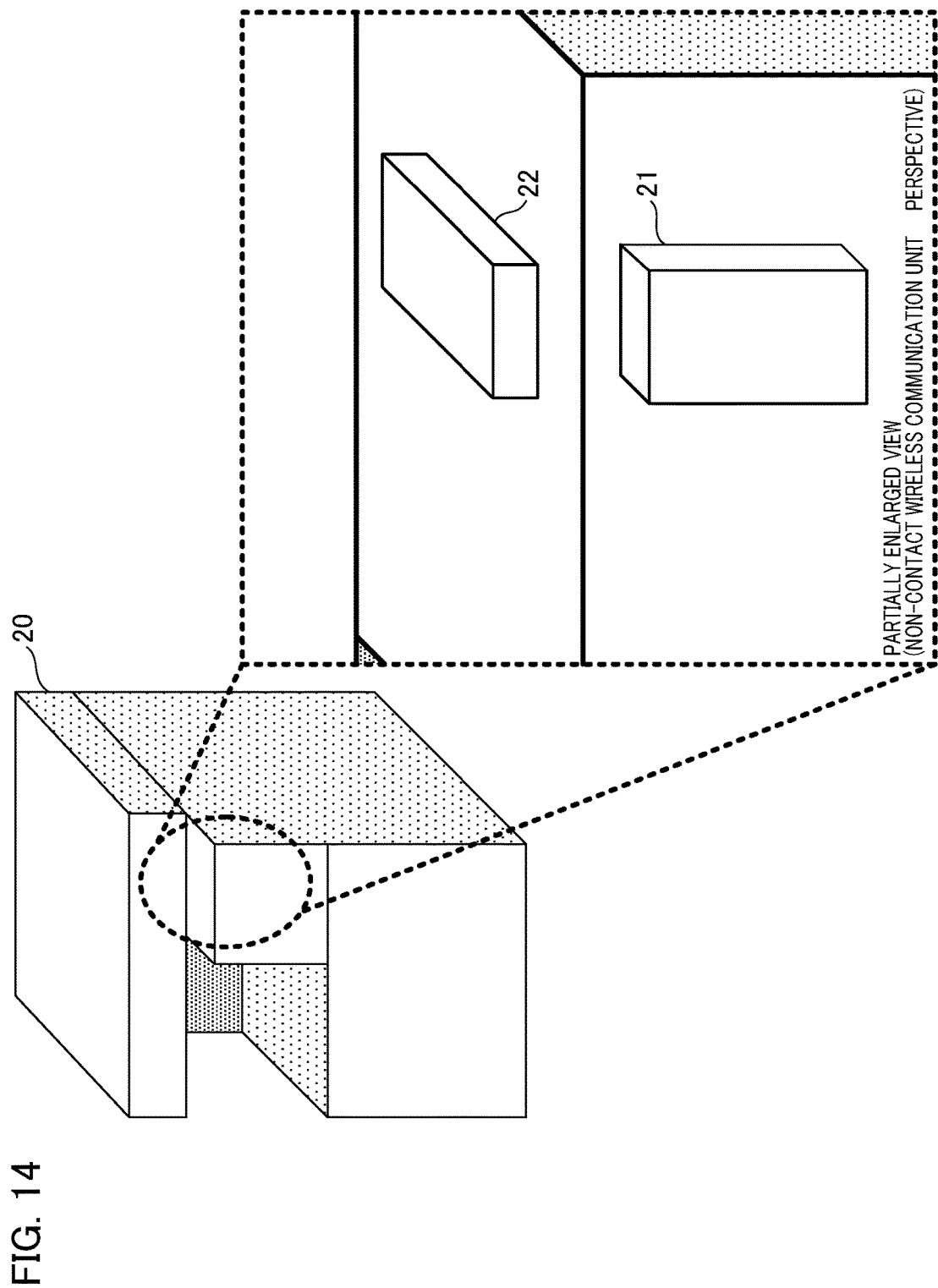
FIG. 14 illustrates an arrangement of the NFC devices in the image forming apparatus.

FIG. 14 illustrates an example of the arrangement of the NFC devices of the image forming apparatus 20 in the present embodiment. As shown in FIG. 14, the non-contact wireless communication unit (tag) 21, which is an NFC device of the image forming apparatus 20, is vertically arranged to the side face of the image forming apparatus 20. Additionally, the non-contact wireless communication unit (card reader) 22 is horizontally arranged.

Each NFC device is arranged so as not to lose the touch location if the user touches the NFC device, and so as not to scatter each NFC device in the casing of the image forming apparatus 20. Additionally, since the NFC tag may react to the magnetic field generated by the NFC card reader, it is arranged so as to maintain a predetermined distance. Note that the arrangement shown in FIG. 14 is an example, and the present invention is not limited thereto. For example, each NFC device may be arranged on the same side face of the image forming apparatus 20. In this case, the tilt of the mobile terminal in accordance with each NFC device arranged in the image forming apparatus 20 may be determined.

Figure 15:
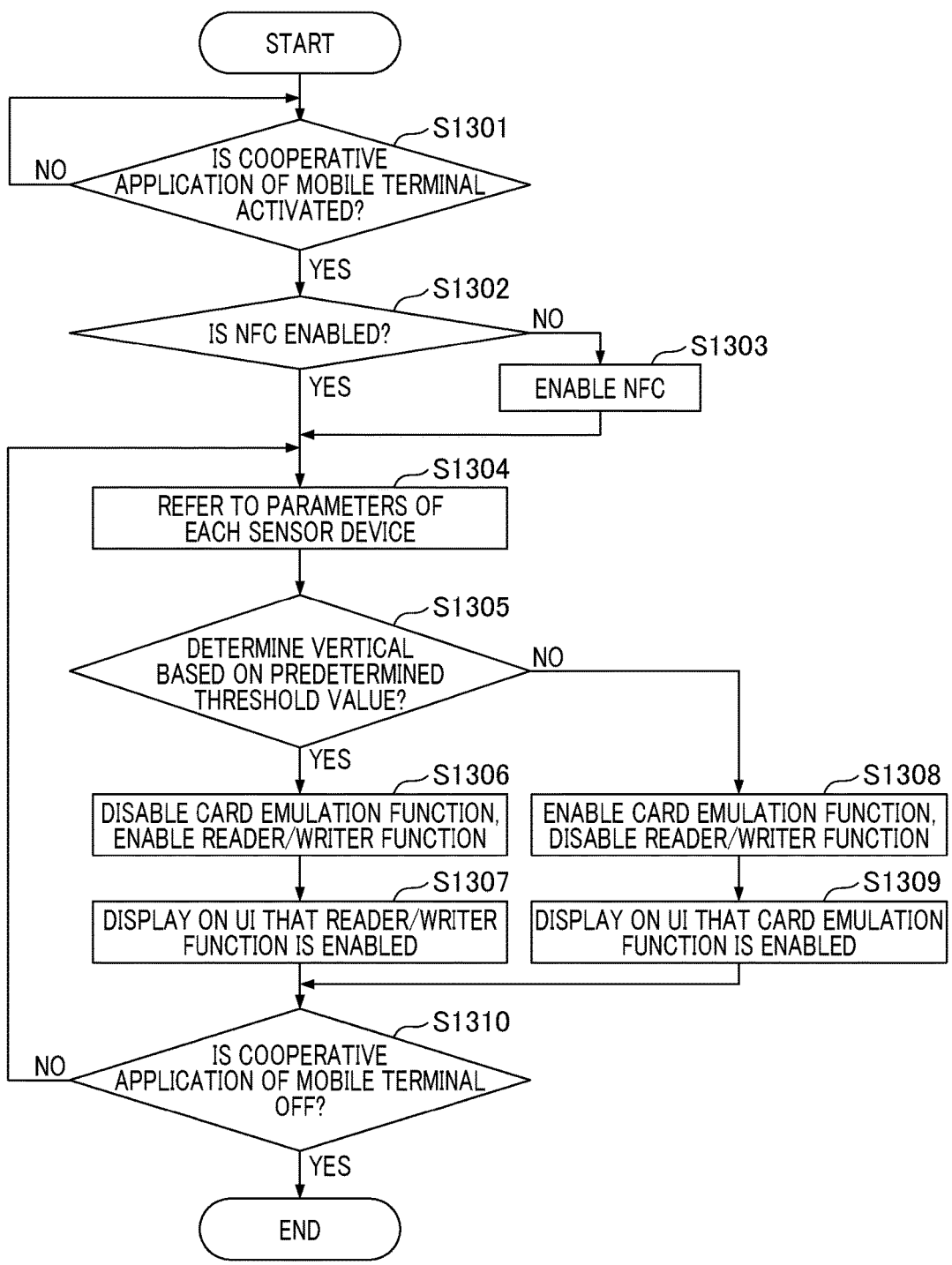
FIG. 15 is a flowchart illustrating the operation of the cooperative application 801 of the mobile terminal.

FIG. 15 is a flowchart illustrating the operation of the cooperative application 801 of the mobile terminal 10 according to the present embodiment. Steps S1301 to S1303 are similar to the processes of steps S901 to S903 of FIG. 9 described in the first embodiment, so that description thereof will be omitted.

In step S1304, the cooperative application 801 refers to parameters obtained from the various sensor devices 115 via the sensor API 807. In step S1305, the cooperative application 801 determines whether the state of the mobile terminal 10 is horizontal or vertical based on the referred parameters. Specifically, based on a predetermined threshold value, the cooperative application 801 determines whether the parameter indicates the horizontal or the vertical.

For example, if the value of the tilt sensor 810 is within the range of 0 degrees±30 degrees or 180 degrees±30 degrees, it is assumed that the mobile terminal 10 is in a horizontal state, and if the value of the tilt sensor 810 is within the range of 90 degrees±30 degrees or 270 degrees±30 degrees, it is assumed that the mobile terminal 10 is in a vertical state. Indefinite sections that are not within the above-mentioned predetermined ranges are provided to serve as a hysteresis section, where a threshold value that flexibly corresponds to is used. If the state of the mobile terminal 10 is determined to be vertical, the process proceeds to step S1306, and the state of the mobile terminal 10 is determined to be horizontal, the process proceeds to step S1308.

In step S1305, the orientation of the mobile terminal 10 is determined to be vertical, and it is possible to determine that the user intends to hand the mobile terminal 10 over the non-contact wireless communication unit (tag) 21 of the image forming apparatus 20. Accordingly, in step S1306, the cooperative application 801 can enable the reader/writer function of the mobile terminal 10 and read information of the NFC tag of the image forming apparatus 20. Additionally, the cooperative application 801 disables the card emulation function of the mobile terminal 10 and performs control so as not to react with another NFC device. The details of the processes in steps 1306 and 1307 are similar to those in steps S907 and S908 of FIG. 9, so the description thereof will be omitted.

In contrast, in step S1305, if the orientation of the mobile terminal 10 is determined to be horizontal, it is possible to determine that the user intends to hold the mobile terminal 10 over the non-contact wireless communication unit (reader/writer) 22 of the image forming apparatus 20. Accordingly, in step S1308, the cooperative application 801 can enable the card emulation function of the mobile terminal 10 and have the NFC reader/writer of the image forming apparatus 20 read the information of the mobile terminal 10. Additionally, the cooperative application 801 disables the card emulation function of the mobile terminal 10 and performs a control so as not to react with another NFC device. The details of the processes in steps 1308 and 1309 are similar to those in steps S904 and S905 of FIG. 9, so the description thereof will be omitted.

In step S1310, it is determined whether or not the cooperative application 801 has ended. If it is not determined that the cooperative application 801 has ended, the process returns to step S1304 and the switching control of the function of NFC in accordance with the tilt (orientation) of the mobile terminal 10 is repeated. If the cooperative application 801 is determined to have ended, the process of FIG. 15 ends.

As described above, according to the present embodiment, in accordance with the arrangement of the NFC device in the image forming apparatus 20 and the tilt (orientation) of the mobile terminal 10 that touches the NFC devices, the mode by which the non-contact wireless communication unit (reader/writer) 11 operates can be appropriately controlled. As a result, a mistaken operation can be suppressed and a wireless communication can be executed in a desired operation mode.

Fourth Embodiment

In the third embodiment, the case where, in the image forming apparatus 20, the non-contact wireless communication unit (tag) 21 is arranged vertically and the non-contact wireless communication unit (card reader) 22 is arranged horizontally has been described. However, the arrangement of these NFC devices may change depending on the apparatus. Hence, according to the present embodiment, it is possible to set which NFC function is enabled and which function is disabled depending on the tilt state of the mobile terminal 10.

Figure 16:
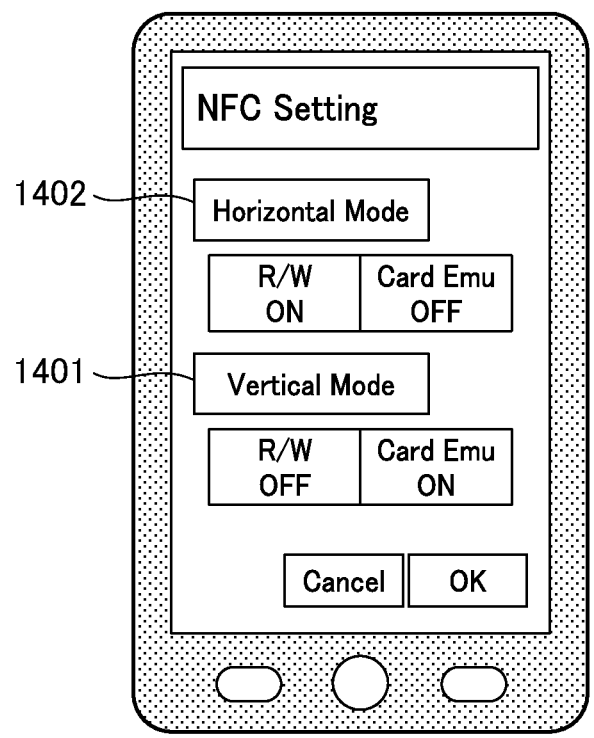
FIG. 16 illustrates an example of a setting screen displayed on the mobile terminal.

FIG. 16 illustrates an example of a setting screen in the mobile terminal 10. In a setting item 1401, if the state of the mobile terminal 10 is determined to be vertical, which function of NFC is to be enabled is selected. The example shown in FIG. 16 is a setting that has the card emulation function enabled and has the reader/writer function disabled if the state of the mobile terminal 10 is determined to be vertical.

Additionally, in a setting item 1402, if the state of the mobile terminal 10 is determined to be horizontal, which function of NFC is to be enabled is selected. The example shown in FIG. 16 is a setting that has the card emulation function disabled and has the reader/writer function enabled if the state of the mobile terminal 10 is determined to be horizontal. That is, the NFC function to be enabled in accordance with the state of the mobile terminal 10, which has been set in FIG. 16, has a setting opposite to the third embodiment.

By setting as above, it is possible to handle even a model having a structure in which, in the image forming apparatus 20, the non-contact wireless communication unit (tag) 21 and the non-contact wireless communication unit (card reader) 22 are arranged opposite to the example shown in FIG. 14. If the cooperative application 801 is activated with the setting in FIG. 16, the process in step S1305 of FIG. 15 executed in the third embodiment is changed. Specifically, if the orientation of the mobile terminal 10 is determined to be vertical, the process proceeds to step S1308, and if the orientation of the mobile terminal 10 is determined to be horizontal, the process proceeds to step S1306. Other processes are the same as those in FIG. 15.

Note that the cooperative application 801 may hold the model information of the image forming apparatus 20 to cooperate with, rather than being set in advance by the user using the setting screen shown in FIG. 16, and if the user selects a model to cooperate with, a predetermined setting may automatically be performed.

As described above, in the present embodiment, an effect similar to that in the third embodiment can be obtained. Furthermore, according to the present embodiment, even if cooperation with each of the arrangements in the image forming apparatus 20 differs depending on the apparatus, the mode by which the non-contact wireless communication unit (reader/writer) 11 operates can be appropriately controlled in accordance with the state of tilt of the mobile terminal 10.

As described above, according to the first to fourth embodiments, in an information processing apparatus having a near field wireless communication function, a mistaken operation can be suppressed to execute wireless communication in a desired operation mode. Thus, it is possible to suppress an incorrect response to an unnecessary NFC device and to reduce a load such as a cancel operation by the user.

OTHER EMBODIMENTS

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-133223, filed Jul. 5, 2016, which is hereby incorporated by reference wherein in its entirety.

What is claimed is:

1. A communication device that is capable of communicating with an external apparatus that comprises a first Near Field Communication (NFC) circuit and a second NFC circuit, the communication device comprising:
a display configured to display information;
a third NFC circuit; and
at least one controller configured to function as:
a unit that causes, in the display, display of a first screen that prompts a user to carry out an operation for starting NFC communication, wherein the first screen is a screen that is displayed in a state in which the third NFC circuit is not permitted to perform specified communication with the first NFC circuit but is permitted to perform specified communication with the second NFC circuit; and
a unit that causes, in the display, display of a second screen that prompts a user to carry out an operation for starting NFC communication, wherein the second screen is a screen that is displayed in a state in which the third NFC circuit is permitted to perform specified communication with the first NFC circuit but is not permitted to perform specified communication with the second NFC circuit.

2. The communication device according to claim 1, wherein the at least one controller is further configured to function as:
a unit that causes, in the display, display of a selection screen for selecting a function to use among a plurality of functions including a first function and a second function,
wherein the first screen is a screen that is displayed after the first function is selected, and the second screen is a screen that is displayed after the second function is selected.

3. The communication device according to claim 2, wherein the first function is a function related to data transmission, and the second function is a function related to authentication.

4. The communication device according to claim 1, wherein the first screen is a screen in which information related to data for transmitting to the external apparatus is arranged.

5. The communication device according to claim 4, wherein the information related to data for transmitting is a preview image.

6. The communication device according to claim 1, wherein the second screen is a screen for performing authentication processing.

7. The communication device according to claim 1, wherein the third NFC circuit communicates with the first NFC circuit and acquires information for establishing other wireless connections.

8. The communication device according to claim 7, wherein the information for establishing other wireless connections is an IP address or SSID.

9. The communication device according to claim 1, wherein the third NFC circuit communicates with the second NFC circuit and transmits identification information.

10. The communication device according to claim 1, wherein the first NFC circuit is an NFC tag.

11. The communication device according to claim 1, wherein the second NFC circuit is an NFC reader.

12. The communication device according to claim 1, wherein the state in which the third NFC circuit is not permitted to perform specified communication with the first NFC circuit but is permitted to perform specified communication with the second NFC circuit is a state in which a card emulation function of the third NFC circuit is set to be disabled and a reader/writer function of the third NFC circuit is set to be enabled.

13. The communication device according to claim 1, wherein the state in which the third NFC circuit is permitted to perform specified communication with the first NFC circuit but is not permitted to perform specified communication with the second NFC circuit is a state in which a card emulation function of the third NFC circuit is set to be enabled and a reader/writer function of the third NFC circuit is set to be disabled.

14. The communication device according to claim 1, wherein the at least one controller is further configured to function as:
a unit that causes, in the display, display of a screen including a message that prompts setting a card emulation function of the third NFC circuit to be disabled and setting a reader/writer function of the third NFC circuit to be enabled.

15. The communication device according to claim 1, wherein the at least one controller is further configured to function as:
a unit that causes, in the display, display of a screen including a message that prompts setting a card emulation function of the third NFC circuit to be enabled and setting a reader/writer function of the third NFC circuit to be disabled.

16. The communication device according to claim 1, wherein the operation for starting NFC communication is an operation for moving the third NFC circuit to a near field region of the first NFC circuit and the second NFC circuit.

17. A control method for a communication device that is capable of communicating with an external apparatus that comprises a first Near Field Communication (NFC) circuit and a second NFC circuit and that comprises a display configured to display information and a third NFC circuit, the control method comprising:
causing, in the display, display of a first screen that prompts a user to carry out an operation for starting NFC communication, wherein the first screen is a screen that is displayed in a state in which the third NFC circuit is not permitted to perform specified communication with the first NFC circuit but is permitted to perform specified communication with the second NFC circuit; and
causing, in the display, display of a second screen that prompts a user to carry out an operation for starting NFC communication, wherein the second screen is a screen that is displayed in a state in which the third NFC circuit is permitted to perform specified communication with the first NFC circuit but is not permitted to perform specified communication with the second NFC circuit.

18. A non-transitory storage medium on which is stored a program for making a computer execute a control method for a communication device that is capable of communicating with an external apparatus that comprises a first Near Field Communication (NFC) circuit and a second NFC circuit and that comprises a display configured to display information and a third NFC circuit, the control method comprising:
causing, in the display, display of a first screen that prompts a user to carry out an operation for starting NFC communication, wherein the first screen is a screen that is displayed in a state in which the third NFC circuit is not permitted to perform specified communication with the first NFC circuit but is permitted to perform specified communication with the second NFC circuit; and causing, in the display, display of a second screen that prompts a user to carry out an operation for starting NFC communication, wherein the second screen is a screen that is displayed in a state in which the third NFC circuit is permitted to perform specified communication with the first NFC circuit but is not permitted to perform specified communication with the second NFC circuit.

* * * * *